United States Patent
Lee

(10) Patent No.: US 10,391,895 B2
(45) Date of Patent: Aug. 27, 2019

(54) RECLINER OF VEHICLE SEAT

(71) Applicant: DAS CO., LTD., Gyeongju-si, Gyeongsangbuk-do (KR)

(72) Inventor: Sang Jun Lee, Ulsan (KR)

(73) Assignee: DAS CO., LTD. (KR)

(*) Notice: Subject to any disclaimer, the term of this patent is extended or adjusted under 35 U.S.C. 154(b) by 0 days.

(21) Appl. No.: 15/943,317

(22) Filed: Apr. 2, 2018

(65) Prior Publication Data
US 2019/0126789 A1    May 2, 2019

(30) Foreign Application Priority Data
Oct. 31, 2017   (KR) .......................... 10-2017-0143336

(51) Int. Cl.
*B60N 2/235*    (2006.01)

(52) U.S. Cl.
CPC .................................. *B60N 2/2362* (2015.04)

(58) Field of Classification Search
None
See application file for complete search history.

(56) References Cited

U.S. PATENT DOCUMENTS

| | | | |
|---|---|---|---|
| 6,312,053 B1* | 11/2001 | Magyar | B60N 2/20 297/367 R |
| 6,474,740 B1* | 11/2002 | Kondo | B60N 2/236 297/367 R |
| 6,908,156 B1 | 6/2005 | Park et al. | |
| 2006/0170269 A1* | 8/2006 | Oki | B60N 2/20 297/367 R |
| 2009/0066137 A1* | 3/2009 | Ishihara | B60N 2/236 297/366 |
| 2009/0200850 A1* | 8/2009 | Heo | B60N 2/2362 297/362 |
| 2011/0025114 A1* | 2/2011 | Berndtson | B60N 2/236 297/367 P |
| 2015/0224898 A1* | 8/2015 | Mase | B60N 2/2356 297/366 |

FOREIGN PATENT DOCUMENTS

KR    20040074688    8/2004

* cited by examiner

*Primary Examiner* — David E Allred
(74) *Attorney, Agent, or Firm* — Perman & Green, LLP

(57) ABSTRACT

A locking device for a vehicle seat. The recliner includes a plate holder including a first catch protrusion on one of a plurality of guide blocks, a sector gear including an internal gear on an inner surface thereof, a plurality of pawl teeth each configured to be moved between a pair of the guide blocks, the pawl teeth including catch hooks on portions of inner surfaces thereof, an operation cam including a second catch protrusion protruding therefrom; and a return spring having a spiral shape, the return spring including a center inner end portion hooked and supported on the second catch protrusion and an outer end portion hooked and supported on the first catch protrusion, wherein a support protrusion protrudes from the operation cam to support the return spring while making point contact with a center inner surface of the return spring.

3 Claims, 4 Drawing Sheets

RECLINER OF VEHICLE SEAT

CROSS REFERENCE TO RELATED APPLICATIONS

This application claims the benefit of Korean Patent Application No. 10-2017-0143336, filed on Oct. 31, 2017, in the Korean Intellectual Property Office, the disclosure of which is incorporated herein in its entirety by reference.

BACKGROUND

1. Field

One or more aspects of the disclosed embodiment relates to a recliner for a vehicle seat, and more particularly, to a recliner for a vehicle seat configured to improve convenience in manipulation by minimizing a contact area supporting an inner portion of a return spring supported at three points.

2. Description of the Related Art

In general, an automotive recliner refers to a device for adjusting the angle of a seat back of a seat with respect to a seat cushion according to the body type or preference of a passenger.

Such a recliner 10 of the related art is disclosed in Korean Patent No. 10-0513576.

FIG. 1 is a view illustrating the recliner 10 of the related art.

Referring to FIG. 1, in the recliner 10 of the related art, a sector gear 30 is rotatably coupled to an inner surface of a recess of a plate holder 20 using a guide bracket. An operation cam 40, pawl teeth 50, and a return spring 60 are placed between the plate holder 20 and the sector gear 30 to restrict rotation of the sector gear 30.

Here, the plate holder 20 is configured to be placed on a seat cushion frame, and a plurality of hinge protrusions 21 and a plurality of guide blocks 22 protrude from a side of the plate holder 20 for rotating and guiding the pawl teeth 50.

The sector gear 30 is configured to be placed on a seat back frame. A penetration hole is formed in a center portion of the sector gear 30, and an internal gear is formed on an inner edge surface of the sector gear 30. The operation cam 40 is placed between the plate holder 20 and the sector gear 30 around the penetration hole of the sector gear 30. The operation cam 40 is configured to be rotated a certain angle.

A shaft hole 41 is formed in a center portion of the operation cam 40 and is spline coupled to a rotation shaft interacting with an operation lever of the recliner 10.

The pawl teeth 50 are arranged on an outer side of the operation cam 40, and as the operation cam 40 is rotated, the pawl teeth 50 are engaged with or disengaged from the internal gear of the sector gear 30 for locking or unlocking the recliner 10.

Protrusions are formed on an outer surface of the operation cam 40, and when the operation cam 40 is rotated, the protrusions push the pawl teeth 50 such that the pawl teeth 50 may be rotated on the hinge protrusions 21.

External gears 51 are formed on end portions of the pawl teeth 50 for engagement with the internal gear of the sector gear 30. Slots are formed in the other end portions of the pawl teeth 50 to receive the protrusions of the operation cam 40, and pressing protrusions configured to be pushed by the protrusions of the operation cam 40 are formed on both sides of the slots.

The return spring 60 is provided between the sector gear 30 and the operation cam 40 to apply elastic force when the recliner 10 is manipulated, and to return the operation cam 40 to an original state when the recliner 10 is released.

The return spring 60 has a spiral shape. An inner end portion of the return spring 60 is hooked on a first catch protrusion 42 protruding from the operation cam 40, and an outer end portion of the return spring 60 is hooked on a second catch protrusion 23 protruding from a guide block 22 of the plate holder 20.

An inner surface of an inner portion of the return spring 60 on which the inner end portion is formed is supported by a projection 44 protruding from a center portion of the operation cam 40 toward the sector gear 30.

When the recliner 10 is manipulated for unlocking, as shown in FIG. 2, the operation cam 40 is rotated counter-clockwise, that is, in a direction in which the return spring 60 is wound, and thus elastic force is applied. Then, when manipulation force is removed, the operation cam 40 is rotated clockwise by the elastic force, thereby locking the recliner 10.

In the recliner 10 of the related art, as shown in FIG. 2, the return spring 60 for locking an unlocking is mounted in a state in which the inner end portion of the return spring 60 is hooked on the first catch protrusion 42 of the operation cam 40, the outer end portion of the return spring 60 is hooked on the second catch protrusion 23 of the guide block 22, and the inner surface of the inner portion of the return spring 60 on which the inner end portion is formed is in surface contact with an outer surface of the projection 44. During unlocking, the return spring 60 applies elastic force in a three-point restricted state by the first catch protrusion 42, the second catch protrusion 23, and the projection 44.

That is, when the return spring 60 applies elastic force while being wound during unlocking, one of the three points, that is, the inner surface of the inner portion of the return spring 60 is in surface contact with the outer surface of the projection 44. Therefore, since the return spring 60 makes surface contact with the outer surface of the projection 44, that is, due to a large contact area, friction increases, and thus convenience decreases when manipulating the recliner 10.

SUMMARY

One or more aspects of the disclosed embodiment include a recliner for a vehicle seat configured to improve convenience in manipulation by reducing a contact area of an inner portion of a return spring supported at three points.

Additional aspects will be set forth in part in the description which follows and, in part, will be apparent from the description, or may be learned by practice of the presently disclosed embodiments.

According to one or more aspects of the disclosed embodiment, a recliner for a vehicle seat includes: a plate holder including a plurality of guide blocks that are radially arranged with a gap therebetween and protrude in an axial direction, a first catch protrusion being formed on at least one of the guide blocks; a sector gear configured to be rotated relative to the plate holder and including an internal gear on an inner surface thereof; a plurality of pawl teeth each configured to be moved between a pair of the guide blocks, the pawl teeth including external gears on outer surfaces thereof for engagement with the external gear, and catch hooks on portions of inner surfaces thereof; an operation cam including a shaft hole in a center portion thereof, a plurality of pull hooks configured to be connected to the catch hooks so as to pull or push the pawl teeth, and a second catch protrusion protruding therefrom; and a return spring having a spiral shape, the return spring including a center inner end portion hooked and supported on the second catch protrusion and an outer end portion hooked and supported on the first catch protrusion, wherein a support protrusion protrudes from the operation cam to support the return spring while making point contact with a center inner surface of the return spring.

The inner end portion and the outer end portion of the return spring may be provided at both sides of the shaft hole of the operation cam, and the support protrusion of the operation cam may be provided between the inner end portion and the outer end portion of the return spring.

The support protrusion may be provided in a direction in which the return spring is wound when the recliner is unlocked.

BRIEF DESCRIPTION OF THE DRAWINGS

These and/or other aspects will become apparent and more readily appreciated from the following description of the disclosed embodiment, taken in conjunction with the accompanying drawings in which.

DETAILED DESCRIPTION

Figure 1:
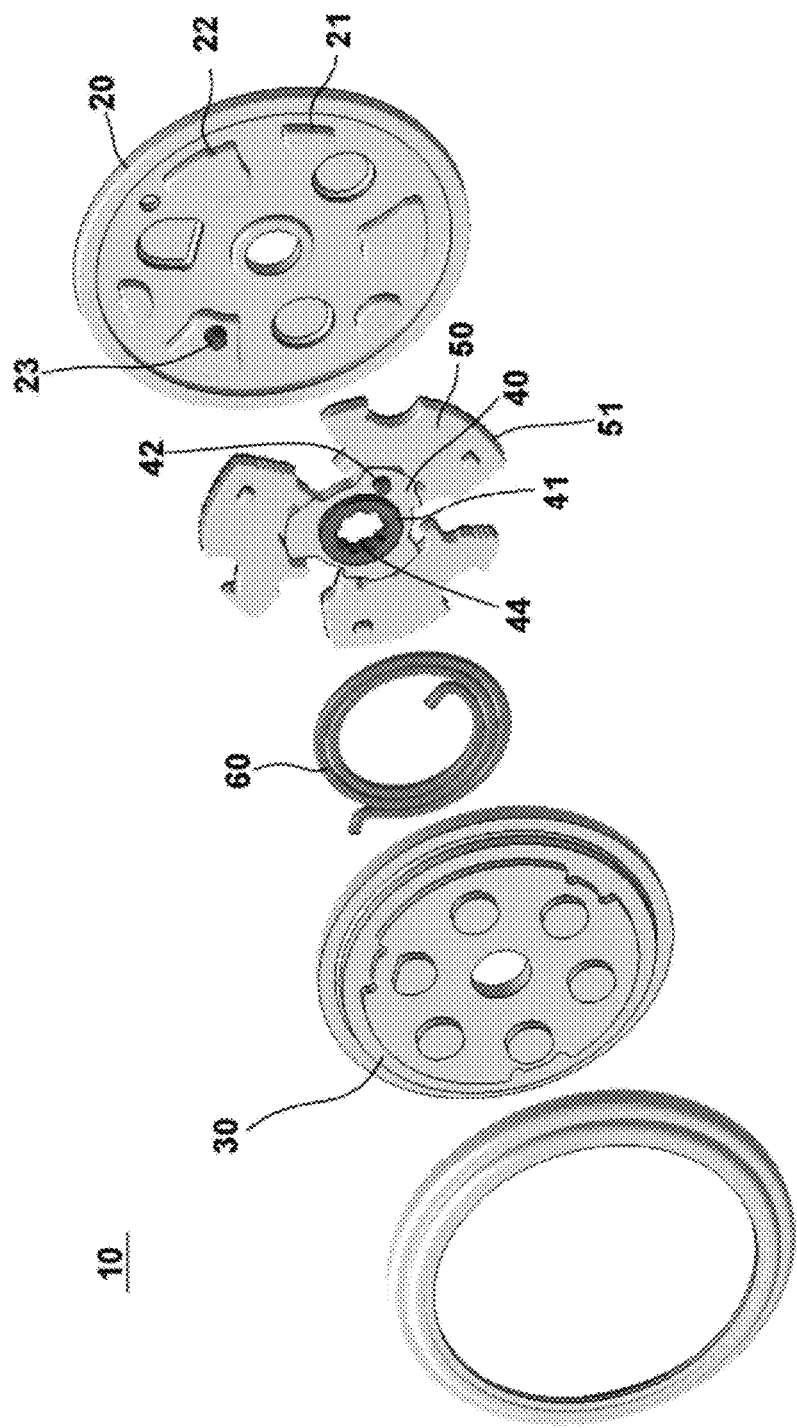
FIG. 1 is an exploded perspective view illustrating a recliner of the related art.

Reference will now be made in detail to aspects of the presently disclosed embodiment, examples of which are illustrated in the accompanying drawings, wherein like reference numerals refer to like elements throughout. In this regard, the presently disclosed embodiment may have different forms and should not be construed as being limited to the descriptions set forth herein. Accordingly, the aspects are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Specific aspects of the presently disclosed embodiment will now be described with reference to the accompanying drawings. In the drawings, thicknesses of lines and sizes of elements may be exaggerated for clarity and ease of illustration. In addition, terms used herein are defined in consideration of functions of the presently disclosed embodiment, but the terms may vary according to the intention of users or operators, or customs. Therefore, these terms should be construed based on the entirety of the present disclosure.

Figure 3:
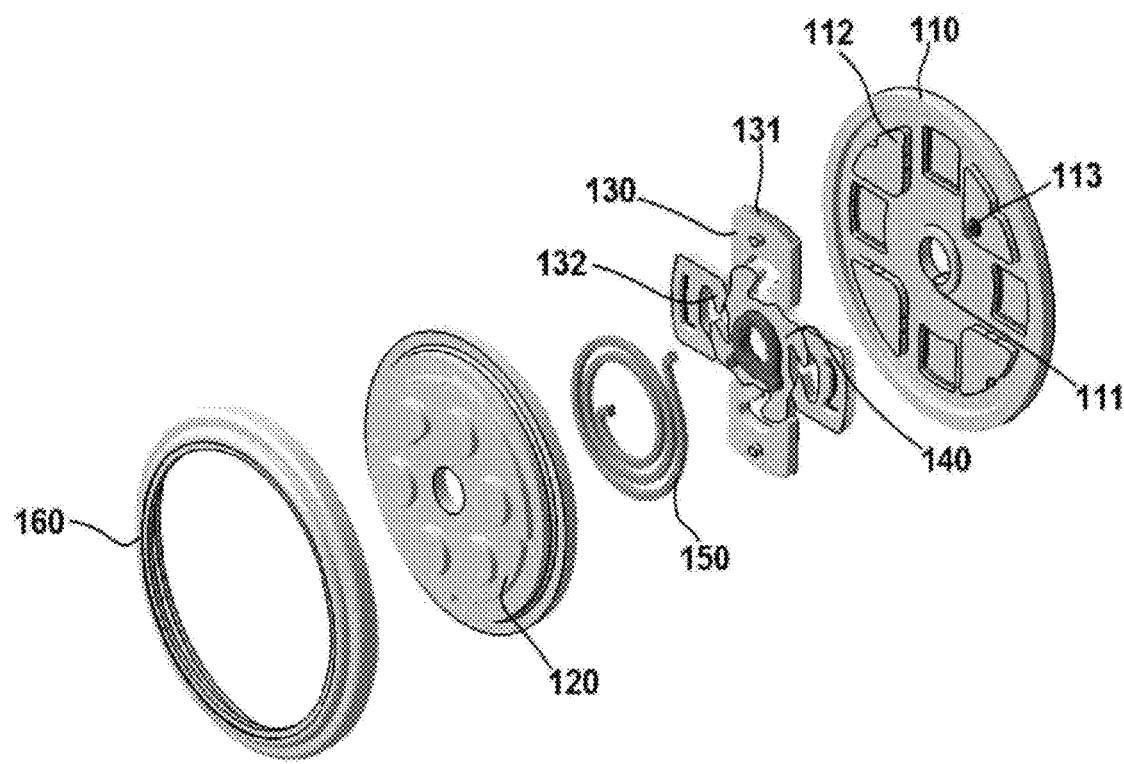
FIG. 3 is an exploded perspective view illustrating a recliner according to an aspect of the presently disclosed embodiment.
Figure 4:
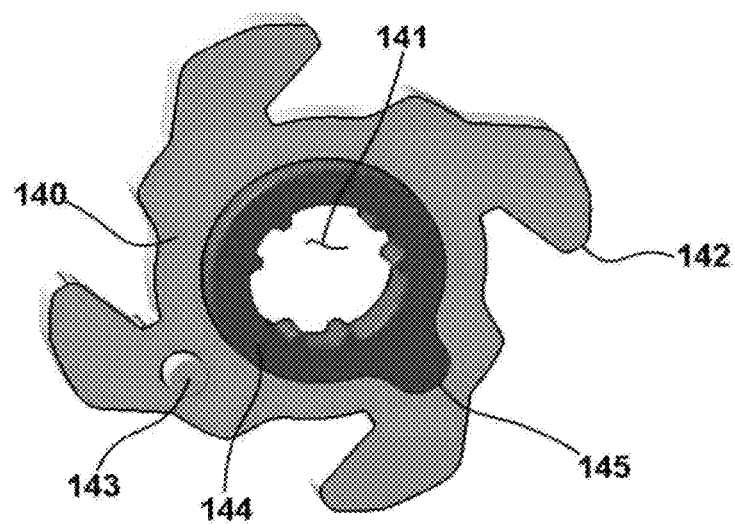
FIG. 4 is a plan view illustrating an operation cam of the recliner illustrated in FIG. 3.
Figure 5:
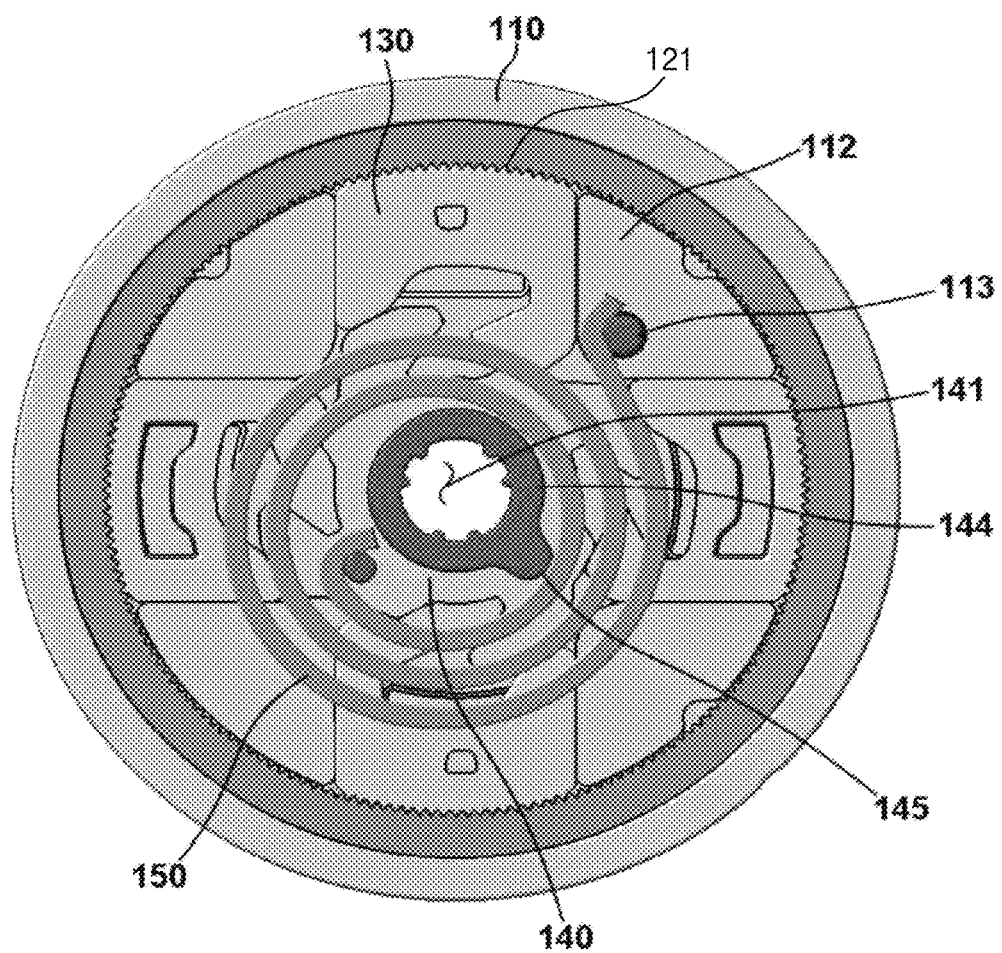
FIG. 5 is a cross-sectional view illustrating the recliner illustrated in FIG. 3.

FIG. 3 is an exploded perspective view illustrating a recliner according to an aspect of the presently disclosed embodiment, FIG. 4 is a plan view illustrating an operation cam 140 of the recliner illustrated in FIG. 3, and FIG. 5 is a cross-sectional view illustrating the recliner illustrated in FIG. 3.

As illustrated in FIGS. 3 to 5, according to the aspects of the presently disclosed embodiment, the recliner for a vehicle seat includes a plate holder 110, a sector gear 120, pawl teeth 130, the operation cam 140, a return spring 150, and a guide ring 160.

The plate holder 110 is configured to be coupled to one of a seat cushion frame and a seat back frame, and a penetration hole 111 is formed in a center portion of the plate holder 110 such that a lever shaft connected to an operation lever may be inserted through the penetration hole 111.

A plurality of guide blocks 112 are provided on a side (facing the sector gear 120) of the plate holder 110 to guide reciprocation of the pawl teeth 130 (described later) in radial directions of the plate holder 110.

Figure 2:
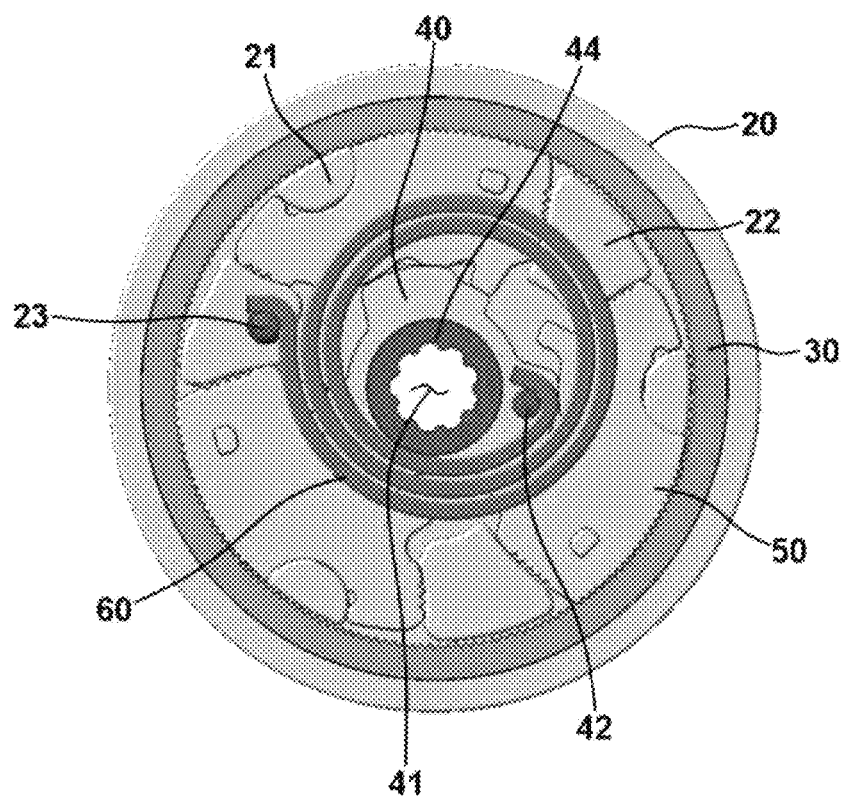
FIG. 2 is a cross-sectional view illustrating the recliner illustrated in FIG. 1.

The plurality of guide blocks 112 are arranged on the side of the plate holder 110 in a radial shape with a gap therebetween, protruding from the side of the plate holder 110 toward the sector gear 120. In the aspect of the presently disclosed embodiment, the number of the guide blocks 112 is four as shown in FIG. 2, but may vary with the number of the pawl teeth 130.

A first catch protrusion 113 protrudes from one of the guide blocks 112 to support an outer end portion of the return spring 150 (described later).

A rim portion protrudes from an outer edge side of the sector gear 120, and an internal gear is formed on an inner surface of the rim portion. The sector gear 120 is coupled to the plate holder 110 using the guide ring 160 and forms an installation space together with the plate holder 110 for the pawl teeth 130, the operation cam 140, and the return spring 150 (described later).

A penetration hole is formed through a center portion of the sector gear 120 and communicates with the penetration hole 111 of the plate holder 110 such that the lever shaft may be inserted through the penetration holes and may rotate when the recliner is operated.

Each of the pawl teeth 130 is placed between a pair of adjacent guide blocks 112 and may be reciprocated in radial directions of the plate holder 110 while being guided by the pair of adjacent guide blocks 112.

Two or more pawl teeth 130 are provided, and external gears 131 corresponding to the internal gear 121 are formed on outer surfaces (facing the internal gear 121 of the sector gear 120) of the pawl teeth 130, and catch hooks 132 configured to be pulled by the operation cam 140 toward the operation cam 140 (described later) are formed on inner surfaces (facing the operation cam 140) of the pawl teeth 130.

The catch hooks 132 protrude from portions of inner surfaces of the pawl teeth 130 toward the operation cam 140 and are then bent to form catch slots in a circumferential direction. That is, the catch hooks 132 protrude from portions of inner surfaces of the pawl teeth 130 directly guided by the guide blocks 112.

In the aspect of the presently disclosed embodiment, a plurality of pawl teeth 130 are provided, and a pair of pawl teeth 130 arranged around the operation cam 140 at an angle of 180° from each other is grouped as one set. In detail, two pairs of pawl teeth 130 are provided as shown in FIG. 3, and each pair of pawl teeth 130 arranged at an angle of 180° from each other is grouped as one set.

The operation cam 140 may be rotated by the lever shaft connected to a manipulation lever of the recliner that a passenger manipulates. To this end, a shaft hole 141 is formed through a center portion of the operation cam 140, and the lever shaft may be inserted through the shaft hole 141 and spline coupled to the operation cam 140. A plurality of protrusions are formed on an inner side of the shaft hole 141 to prevent the lever shaft from rotating relative to the shaft hole 141, and grooves having shapes corresponding to the protrusions are longitudinally formed in an outer surface of the lever shaft.

The operation cam 140 is placed on a center portion of the plate holder 110 in a state in which the shaft hole 141 of the operation cam 140 communicates with the penetration hole 111 of the plate holder 110. The operation cam 140 is placed at a center position surrounded by the plurality of pawl teeth 130 to lock or unlock the recliner by pushing or pulling the pawl teeth 130.

Pull hooks 142 protrude from an outer surface of the operation cam 140 toward the catch slots of the catch hooks 132 of the pawl teeth 130 such that the pull hooks 142 may be connected to the catch hooks 132 of the pawl teeth 130 to pull the pawl teeth 130 toward the operation cam 140 or push the pawl teeth 130 toward the internal gear 121 of the sector gear 120. The number of the pull hooks 142 is the same as the number of the pawl teeth 130 such that the pull hooks 142 may correspond to the catch hooks 132 of the pawl teeth 130, and when the operation cam 140 is rotated (when the recliner is locked or unlocked), the pull hooks 142 spontaneously pulls or pushes the pawl teeth 130. Insertion slots are formed in the pull hooks 142 such that the catch hooks 132 may be inserted into the insertion slots.

A second catch protrusion 143 protrudes from a surface (facing the sector gear 120) of the operation cam 140 to support an inner end portion of the return spring 150 (described later). A support projection 144 having a ring shape protrudes from an edge portion of the operation cam 140 around the shaft hole 141 to support an inner side of the return spring 150 (described later).

The return spring 150 has a spiral shape, and the outer end portion and the inner end portion of the return spring 150 are bent so as to be respectively hooked on the first catch protrusion 113 and the second catch protrusion 143.

A portion of the return spring 150 on which the inner end portion is formed is referred to as an inner portion, and the inner portion is supported by the support projection 144 of the operation cam 140, that is, a support protrusion 145 (described later).

Here, as shown in FIG. 5, the inner end portion and the outer end portion of the return spring 150 are provided at both sides of the shaft hole 141 at an angle of greater than 90°, preferably about 180°.

The support protrusion 145 is provided on the support projection 144 of the operation cam 140, and when the return spring 150 supported by the support projection 144 is wound and applies elastic force during unlocking of the recliner, the support projection 144 does not make surface contact with an inner surface of the return spring 150 but makes point contact with the inner surface of the operation cam 140 owing to the support protrusion 145.

The support protrusion 145 is provided between the inner end portion and the outer end portion of the return spring 150, and when the return spring 150 is wound during unlocking of the recliner, it is preferable that the support protrusion 145 make point contact with an inner surface of the inner portion of the return spring 150 for smooth rotation of the operation cam 140.

In addition, preferably, the support protrusion 145 is formed in a counterclockwise direction (a direction in which the return spring 150 is unwound) from the inner end portion of the return spring 150.

An operation of the recliner for a vehicle seat will now be briefly described according to an aspect of the presently disclosed embodiment.

In general, a vehicle seat is put in a state in which the inclined angle of a seat back is fixed to a certain value. That is, the recliner is usually put in a locked state. That is, the recliner is in a locked state in which the external gears 131 of the pawl teeth 130 are engaged with the internal gear 121 of the sector gear 120 to prevent rotation of the sector gear 120.

In this state, a passenger may manipulate the operation lever of the recliner to adjust the inclination of the seat back. Then, the lever shaft connected to the operation lever of the recliner is rotated a certain angle, and then the operation cam 140 is also rotated a certain angle by the rotation of the lever shaft.

At this time, as the pull hooks 142 of the operation cam 140 are inserted into the catch slots of the catch hooks 132 of the pawl teeth 130, the pull hooks 142 pull the pawl teeth 130.

Then, the external gears 131 of the pawl teeth 130 engaged with the internal gear 121 of the sector gear 120 are separated and disengaged from the internal gear 121 of the sector gear 120, and thus the recliner is unlocked.

According to the presently disclosed embodiment, when the return spring 150 applies elastic force while being wound during unlocking of the recliner, the inner surface of the inner portion of the return spring 150 is in point contact with the support protrusion 145 of the operation cam 140, thereby minimizing friction between the return spring 150 and the operation cam 140 and improving manipulation of the recliner.

While the presently disclosed embodiment has been described with reference to the accompanying drawings according to aspects, these aspects are for illustrative purposes only, and it will be understood by those of ordinary skill in the art that various changes and other equivalent aspects may be made therefrom. Therefore, the scope and spirit of the presently disclosed embodiment should be defined by the following claims.

What is claimed is:

1. A recliner for a vehicle seat, the recliner comprising:
    a plate holder comprising a plurality of guide blocks that are radially arranged with a gap therebetween and protrude in an axial direction, a first catch protrusion being formed on at least one of the guide blocks;
    a sector gear configured to be rotated relative to the plate holder and comprising an internal gear on an inner surface thereof;
    a plurality of pawl teeth each configured to be moved between a pair of the guide blocks, the pawl teeth comprising external gears on outer surfaces thereof for engagement with the external gear, and catch hooks on portions of inner surfaces thereof;
    an operation cam comprising a shaft hole in a center portion thereof, a plurality of pull hooks configured to be connected to the catch hooks so as to pull or push the pawl teeth, and a second catch protrusion protruding therefrom; and
    a return spring having a spiral shape, the return spring comprising a center inner end portion hooked and supported on the second catch protrusion and an outer end portion hooked and supported on the first catch protrusion,
    wherein a projection protrudes axially from the operation cam and comprises a support protrusion that protrudes radially from a remainder of the projection to support the return spring while making point contact with a center inner surface of the return spring.

2. The recliner of claim 1, wherein the inner end portion and the outer end portion of the return spring are provided at both sides of the shaft hole of the operation cam, and
   the support protrusion of the operation cam is provided between the inner end portion and the outer end portion of the return spring.

3. The recliner of claim 2, wherein the support protrusion is located from the outer end portion of the return spring in a direction in which the return spring is wound when the recliner is unlocked.

\* \* \* \* \*